1,467,278

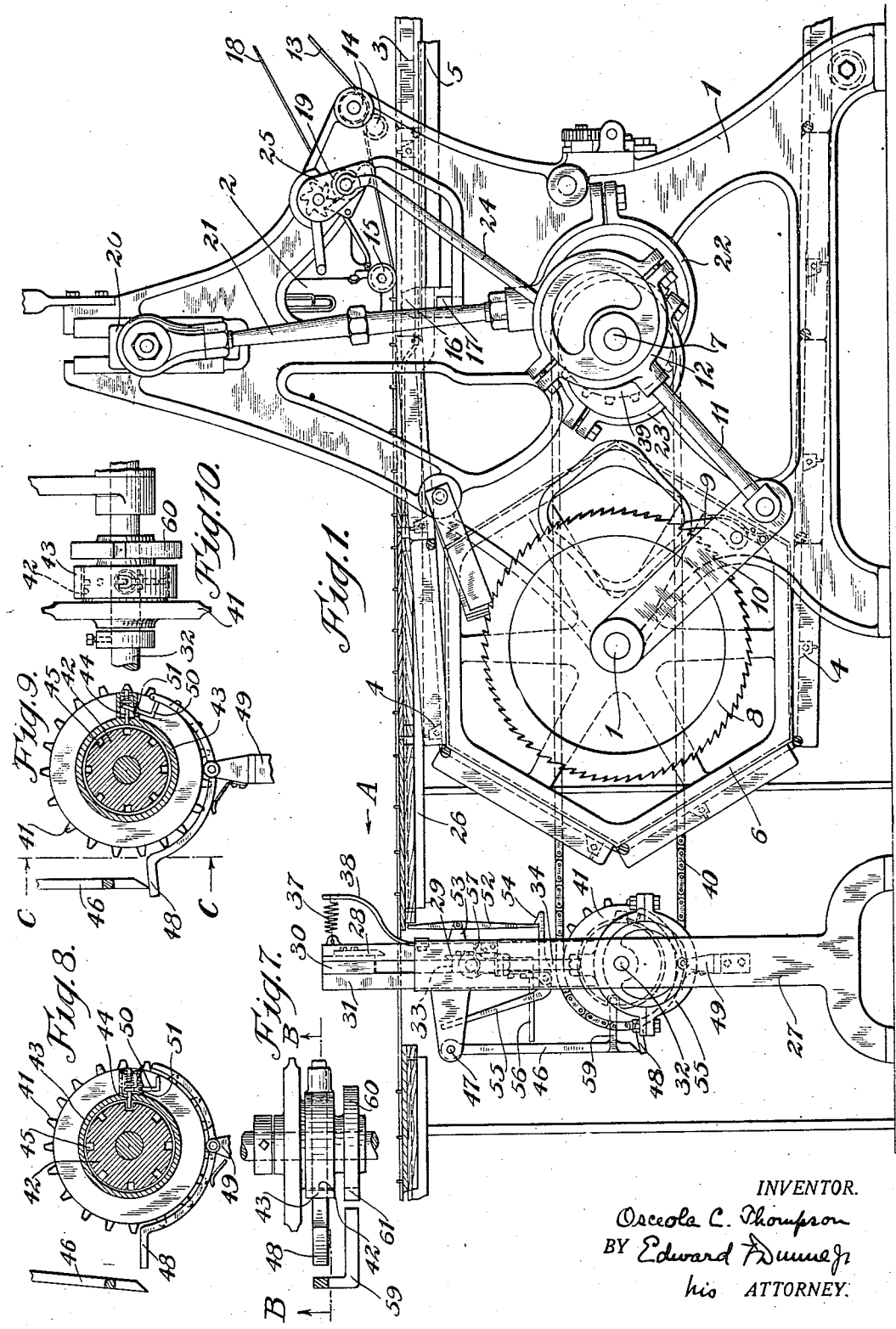

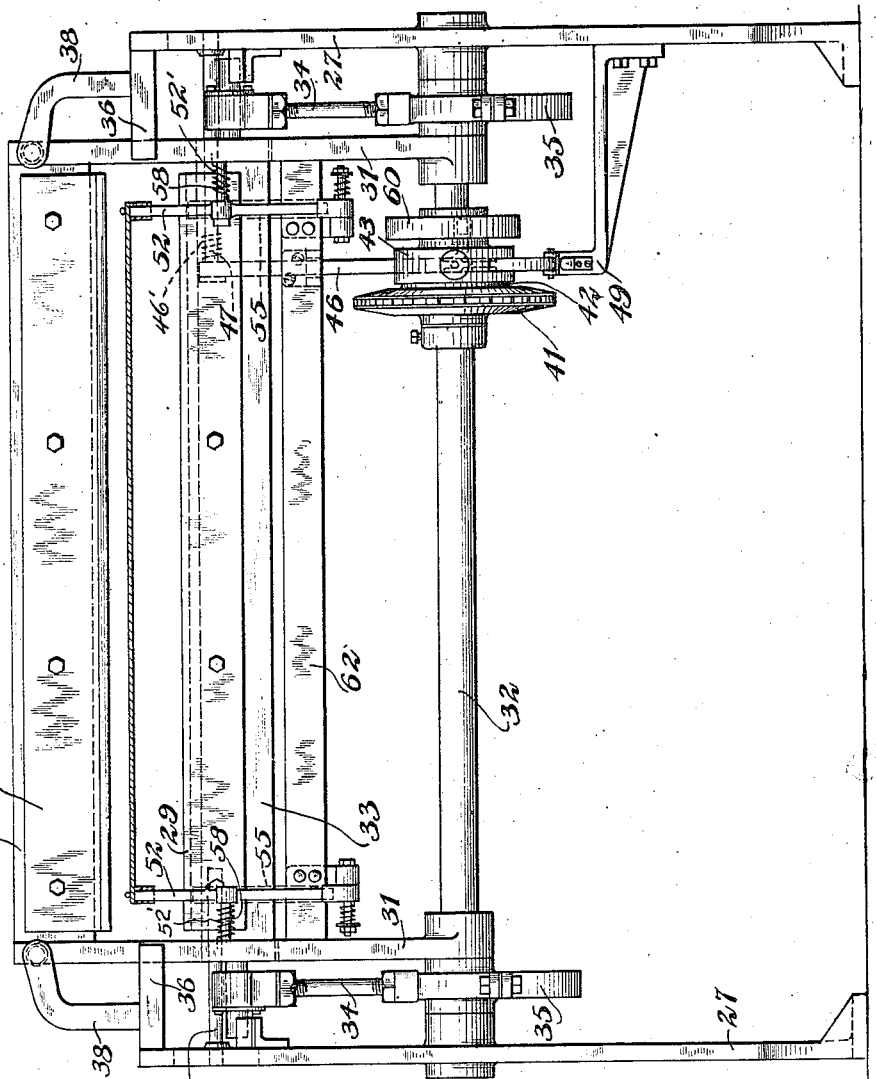

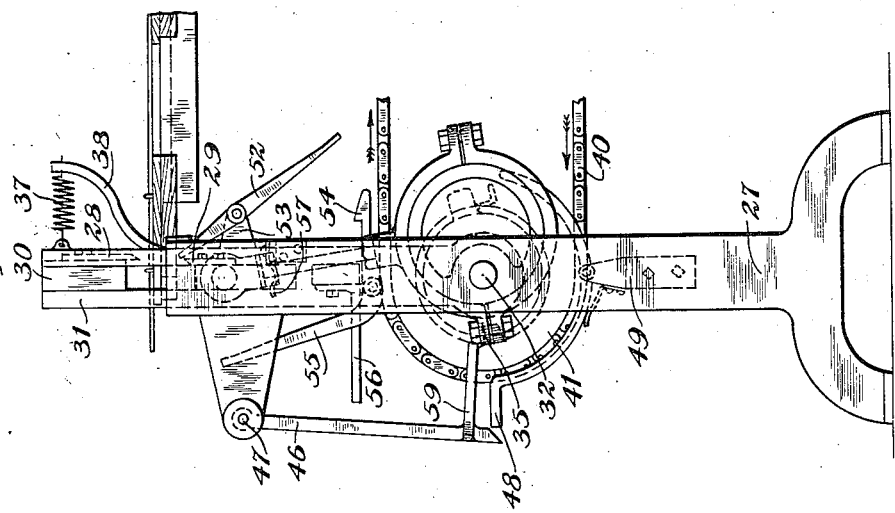
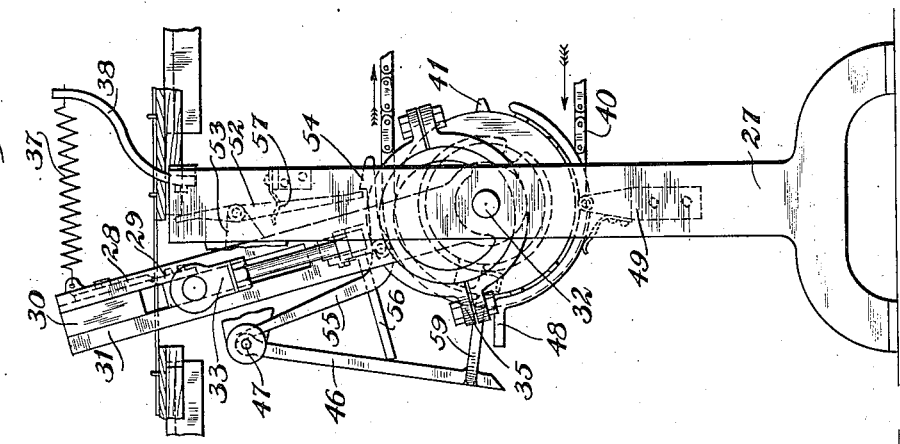
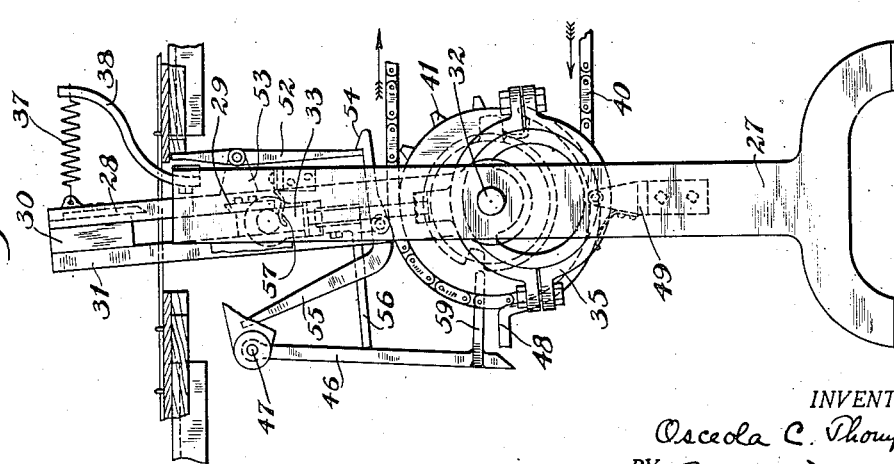
INVENTOR.
Osceola C. Thompson
BY Edward Dunne Jr
his ATTORNEY Patented Sept. 4, 1923.

UNITED STATES PATENT OFFICE.

OSCEOLA C. THOMPSON, OF WHITE PLAINS, NEW YORK, ASSIGNOR TO WIREBOUNDS PATENTS COMPANY, A CORPORATION OF MAINE.

MACHINE FOR USE IN MAKING BOXES.

Application filed April 8, 1920. Serial No. 372,162.

*To all whom it may concern:*

Be it known that I, OSCEOLA C. THOMPSON, a citizen of the United States, residing at White Plains, in the county of Westchester, in the State of New York, have invented new and useful Improvements in Machines for Use in Making Boxes, of which the following is a specification.

This invention relates to machines for use in making wirebound boxes, box blanks or parts, and, particularly, to means for severing the binding wire between box parts.

The invention will be best understood by reference to one form of machine containing an embodiment thereof, which is shown for illustration in the accompanying drawings.

The machine selected for illustration is a wirebound box blank machine adapted for uninterrupted operation in making a number of wirebound box blanks in succession, continuous lengths of binding wire being applied to successive assemblies of blank materials; and one purpose of the invention in such illustrative embodiment, is to sever the binding wire between successive blanks.

Obviously, the invention is not limited in its application to a machine of this particular type.

In the drawings:

Fig. 1 is a side elevation of the illustrative box blank machine, omitting the receiving end portion of the work conveyer.

Fig. 2 is an enlarged end elevation of the cutting mechanism, seen from A in Fig. 1.

Figs. 3, 4, 5, and 6 are enlarged side elevations of the cutting mechanism during different phases of its operation, illustrating the movement of the parts.

Fig. 7 is an enlarged plan view of the clutch mechanism for controlling the operation of the cutting mechanism.

Figs. 8 and 9 are diagrammatic sectional views of the clutch mechanism taken on the line B—B of Fig. 7.

Fig. 10 is an end elevation of the clutch mechanism seen from line C—C in Fig. 9.

The illustrative machine comprises between supporting side frames 1 a gang of staplers 2 and a relatively movable workholder 3 for assembled cleats and side material for crate or box blanks or for assemblies of foldably related box sections.

The work-holder 3 is in the form of a circulating conveyer having work-positioning means for a succession of box blanks or sections; said conveyer comprising a pair of endless chains appropriately channel-shaped to receive the box cleats and having spacer blocks 4 affixed thereon at intervals for determining proper relations of the cleats and side material of adjacent box sections, or of the cleats and side material for a blank, and for spacing successive blanks apart.

Box sections are successively assembled on the conveyer chains by placing cleats thereon in pairs between the spacer blocks 4 and laying sheets of side material thereacross or, if desired, slatted side material for a crate may be laid across said cleats, or an integral sheet of side material for a blank may be placed upon a succession of cleats.

The conveyer chains run on horizontal guide rails 5 and at the delivery end of the machine are trained around the driven sprocket wheels 6, which may be rotated from the main shaft 7 by any suitable means; for instance, by the ratchet feed mechanism shown in Fig. 1 comprising ratchet wheel 8 and coacting feed pawl 9 carried by lever 10 which is operated through rod 11 from eccentric 12.

With the type of feed mechanism described, the conveyer and work thereon will be advanced to the staplers step by step, in alternation with the stapling operations; and associated with said mechanism there may be provided any suitable devices, not necessary to be illustrated, for varying, adjusting, or controlling the feed, for skipping the stapling operation at the box joints, for manually independently rotating the conveyer sprockets for initial work adjustment or otherwise, and for braking the conveyer sprockets at the completion of each feed step.

Suitable means for these purposes are shown, for example, in the patent to Thompson No. 1,258,625, dated March 5, 1918, and in the application of Bauwens, Serial No. 284,332, filed March 22, 1919.

As the work progresses beneath the staplers, a plurality of continuous lengths of binding wire 13 drawn from suitable supply reels, not shown, are introduced in proper relation to the box sections to be stapled thereto, the wires being led between the rollers 14 and thence under the rollers 15 at the feet of the stapler bodies and being pulled along with the work by virtue of their attachment thereto at preceding points. Certain of the wires aligned with the box cleats are stapled through the sheets thereto so as to connect such wires to both the sheets and cleats and secure the latter together; and intermediate wires are or may be stapled to the sheets alone and clinched on their under sides by coaction of the staple drivers with anvils 16 supported on the cross frame member 17.

The staplers 2 may be of the type disclosed, for example, in the aforesaid patent to Thompson, No. 1,258,625, dated March 5, 1918, comprising combined staple formers and drivers adapted at every operation to cut and form staples from staple stock wire 18 fed thereto by rollers 19, and to drive the same over the binding wires, into the work. Said staplers are mounted on a stationary cross-head, not shown, and are actuated by the vertically reciprocating cross-bar 20 working in guides of the side frames 1 and operated by a pitman 21 from eccentric 22 on the main shaft, there being similar operating connections at either side of the machine. The feed rollers 19 for the staple stock wires are also operated from the main shaft by eccentric 23 and connecting rod 24 working a pawl and ratchet device 25 for rotating the rollers intermittently.

With the intermittent feed type of machine described, a staple is formed and driven at every reciprocation of the cross-bar 20, the staple being driven on the downward stroke thereof while the material is momentarily at rest, the extent of movement of material between successive operations of the staplers determining the spacing between successive staples.

It will be understood that this specific machine is but one illustrative example of a machine to which my invention is applicable in which box parts are successively wired together by effecting relative progression between the work and fastener-setting mechanism, and in which desired relative positions of adjacent box parts are properly maintained during the wiring of such parts together; various constructions and arrangements for these functions being already known to the art.

Referring again to the illustrative machine, as the work leaves the stapling mechanism the finished blank may be stripped from the conveyer chains on to table-bars 26, and while on said table-bars the wires connecting one blank with another may be severed by the automatic cutting mechanism presently to be described.

The binding wires are intended to be severed between one blank and the next in such manner as to leave free wire ends projecting beyond the ends of the blank so that when the blank is folded into box form these projecting wire ends may be twisted or otherwise secured together to close the box. To suit this purpose the materials for succeeding blanks are suitably spaced to leave between them a sufficient length of wire to provide, when severed, the desired free ends. Such spacing may be effected, for example, by placing the group of work-positioning devices or spacer blocks 4 for each blank or assembly somewhat ahead of the group for the next blank or assembly.

Mechanism for severing the binding wires is arranged at the delivery end of the machine at a suitable distance from the sprocket wheels 6 and supported by the independent body or frame 27.

The illustrative wire-severing mechanism comprises a pair of relatively movable knives 28 and 29 which extend entirely across the machine, one above and one below the plane of the work, and are adapted upon presentation of a cutting space to cooperate to sever the binding wires between them.

As shown in Fig. 2, knife 28 is bolted to cross-bar 30 carried by supports 31 pivotally mounted on the shaft 32. Knife 29 is bolted to cross-bar 33 slidably mounted in the supports 31 and reciprocable vertically through pitman 34 and eccentric 35 on the shaft 32. The supports 31 and the cutting mechanism carried thereby are normally yieldingly held in vertical position against stops 36 carried by the supporting frames 27 through the action of springs 37 secured to arms 38 extending from the frames 27.

The knives 28 and 29 are so arranged that upon revolution of the shaft 32 movable knife 29 will rise until its cutting edge meets and passes the cutting edge of stationary knife 28, cutting all the wires connecting adjacent box blanks at a single operation.

Shaft 32 is operated from sprocket 39 on main shaft 7 through the sprocket chain 40 and sprocket wheel 41 loosely mounted on shaft 32 and adapted to be intermittently clutched to shaft 32 by any suitable controllable clutch mechanism.

It is obvious that the cutting mechanism need operate only when a space between box blanks presents itself and that at other times said mechanism may remain stationary.

Clutch mechanism is therefore provided which is normally broken but which may be thrown into operation at selected times to cause one revolution of the shaft 32 and, consequently, one operation of the cutting mechanism. Such clutch mechanism may consist of the clutch hub 42 formed as a part of and revolving with sprocket wheel 41, the sleeve 43 keyed to shaft 32 and within which the hub 42 is normally free to revolve, and means to automatically lock the hub 42 and the sleeve 43 for one revolution of the shaft 32 and to break the connection upon the completion of one revolution of said shaft 32.

The illustrative mechanism for connecting or locking hub 42 and sleeve 43 comprises a spring-pressed trigger 44 carried in a slot in sleeve 43 and adapted, when released, to enter one of a number of notches 45 formed at intervals in the hub 42. Said trigger 44 is normally withheld from contact with notches 45 by means of arm 46 pivotally hung from stud shaft 47 acting through lever 48 pivotally supported by bracket 49 on frame 27 and lever 50 pivotally mounted on the sleeve 43 at 51 and having connection with trigger 44. It will be noted that arm 46, by reason of its contact with lever 48, holds trigger 44 out of engagement with notches 45, thus permitting hub 42 and sprocket 41 to revolve without imparting movement to cutter-operating shaft 32. For releasing trigger 44 to throw in the clutch, arm 46 is disengaged from lever 48, thus releasing the pressure on the lower end of lever 50 and permitting the trigger 44 to snap into one of the notches 45.

Arm 46 is disengaged from lever 48 at proper times for a cutting operation by the action of the oncoming box blank or work assembly which engages the cutting mechanism and swings it about shaft 32 as a pivot. As shown in Figs. 1 and 3, the forward edge of the oncoming blank contacts with the upper end of a trigger 52 pivotally mounted on a stud shaft 58 supported in bracket 53 carried by support 31 and held at its lower end by a notch 54 carried at one end of a bell crank lever 55 pivoted to a bracket carried by the cross frame member 62. As illustrated a trigger 52 and a bell crank lever 55 may be provided at both sides of the machine. As best shown in Figs. 4, 5, and 6, continued movement of the work against the trigger 52 swings supports 31 and the cutting mechanism to the left and immediately arm 56, carried by cross frame member 62, kicks arm 46, releasing lever 48 and trigger 44 to throw in the clutch. With the clutch thrown in, shaft 32 revolves, raising movable knife 29 until its cutting edge meets and passes the cutting edge of knife 28, severing the binding wires therebetween.

As shown in Figs. 4, 5, and 6, supports 31 and the cutting mechanism continue to move to the left until the upper end of bell crank lever 55 contacts with stud shaft 47, whereupon trigger 52 is released from engagement with notch 54 and swings under the work as shown in Fig. 6. Springs 37 then return the cutting mechanism to initial position against stops 36, where it may be held by spring 57. Trigger 52 continues to drag on the under side of the work, as shown in Fig. 6, until the next gap or space between box blanks presents itself, whereupon trigger 52 is returned to initial position by a suitable spring $52^1$.

As the cutting mechanism returns to initial position against the stops 36, arm 46, which is beveled at its lower extremity, is returned by a suitable spring $46^1$ and reengages lever 48, thereby disengaging the trigger 44 from notch 45 and throwing out the clutch.

To insure a complete revolution of shaft 32 each time the clutch mechanism is thrown in, mechanism is provided to prevent engagement of arm 46 and lever 48 until the completion of a revolution of shaft 32.

As shown in Figs. 3, 4, 5, 6, and 7, such mechanism may comprise the arm 59 extending from arm 46 and adapted to ride on the outer surface of a disc 60 formed as a part of the sleeve 43. Arm 59, by contact with the disc 60, will hold arm 46 from contact with lever 48 until notch 61, formed at the proper point in disc 60, is presented to the arm 59, which enters the notch 61 thereby permitting the arm 46 to engage lever 48 and throw out the clutch mechanism.

The operation of the cutting mechanism is clearly illustrated in Figs. 3 to 10 inclusive. In Fig. 3 the forward edge of the oncoming box blank has just engaged trigger 52. In Fig. 4 the cutting mechanism has started to revolve about the shaft 32 by the action of the moving work contacting with trigger 52 and the arm 56 has just tripped the arm 46 to throw in the clutch mechanism. Fig. 5 shows the knives 28 and 29 cutting the wire, the movable knife having risen by the action of the eccentric. In this figure, the cutting operation is just being completed and lever 55 is about to be tripped to release trigger 52 to permit the return of the cutting mechanism to initial position. In Fig. 6 the cutting mechanism has been returned by the springs 37 against the stops 36, the movable knife is returning to initial position, and the notch 61 in the disc 60 has about completed its revolution so that the arm 59 may enter the notch 61 and permit the arm 46 to engage the lever 48 to disengage the clutch mechanism. The cutting mechanism will remain inoperative until another space between box blanks presents itself, when the trigger 52 will return to the position shown in Fig. 1 to be engaged by the forward edge of the next blank.

It will be noted that the point of cut off is gauged from the edge of the oncoming work by the trigger 52 and that the wires between successive blanks will be uniformly severed at the same point relative to the edge of each succeeding blank.

It will also be noted that the cutting mechanism accompanies the movement of the work during a cutting operation and that the cut off may take place while the work is at rest or while the work is moving; that is, after the clutch controlling the cutting operation is thrown in, the cutting operation continues regardless of the movement of the work.

It will be further noted that a plurality of wires connecting adjacent blanks are severed at one operation of a single cutting mechanism, thus insuring a uniform length of free wire ends on each blank.

Obviously, the present invention is not limited to the particular embodiment shown and described but may be variously embodied and the particular construction shown may be variously modified, as will appear to those skilled in the art. Furthermore, it is not indispensable that all the features of the invention be used conjointly since they may be used to advantage in various different combinations and sub-combinations.

Having described the invention, what is claimed is:

1. A machine for use in making wirebound boxes comprising, in combination, intermittently moving work-forwarding means; mechanism to apply binding wire to box parts; and wire-severing means operable while the work is moving or stationary.

2. A machine for use in making wirebound boxes comprising, in combination, intermittently moving work-forwarding means; mechanism to apply binding wire to box parts; and wire-severing means automatically adjustable for operation during a feeding movement of the work or while the work is stationary.

3. A machine for use in making wirebound boxes comprising, in combination, intermittently moving work-forwarding means; mechanism to apply binding wire to box parts; and wire-severing means normally inoperative but rendered operative by movement of the work thereagainst and adapted to operate while the work is moving or after the work comes to rest.

4. A machine for use in making wirebound boxes comprising, in combination, a work support; means to feed the work step by step; mechanism to apply binding wire to the work; and wire-severing means periodically thrown into operation by the movement of the work and adapted to sever the wire during a continued work movement or after the work comes to rest.

5. A machine for use in making wirebound boxes comprising, in combination, work-positioning means for assembling and spacing box parts; mechanism to apply binding wire to the box parts; means to cause relative progression between said mechanism and the box parts; and wire-severing means to sever the wire in said previously-formed spaces; said wire-severing means being thrown into operation by movement of the work thereagainst and adapted to continue its operation, while the work is moving or after the work comes to rest.

6. A machine for use in making wirebound boxes comprising, in combination, a work support; mechanism to apply binding wire to box parts progressively subjected to the action thereof; means to space box parts; and a single wire-severing means adapted to sever a plurality of wires; said machine being organized for continuous operation upon materials for a plurality of boxes.

7. A machine for use in making wirebound boxes comprising, in combination, a work support; mechanism to apply binding wire to box parts progressively subjected to the action thereof; means to space box parts; and wire-severing means comprising a pair of cutting members adapted to sever a plurality of wires; said machine being organized for continuous operation upon materials for a plurality of boxes.

8. A machine for use in making wirebound boxes comprising, in combination, a work support; mechanism to apply binding wire to box parts progressively subjected to the action thereof; means to space box parts; and a pair of cutting members adapted to cooperate in a space between box parts to sever a plurality of spaced wires secured to said box parts; said machine being organized for continuous operation upon materials for a plurality of boxes.

9. A machine for use in making wirebound boxes comprising, in combination, a work support; mechanism to apply binding wire to box parts; means to cause relative progression between said mechanism and the work; and wire-severing means comprising a pair of cutting members extending across the machine, one above and one below the wire; and means controlled by the work for operating said wire-severing means.

10. A machine for use in making wirebound boxes comprising, in combination, a work support; mechanism to apply binding wire to box parts; means to cause relative progression between said mechanism and the box parts; and a single wire-severing means controlled by said relative progression and adapted to sever a plurality of wires, said machine being adapted to operate without interruption upon materials for a plurality of boxes.

11. A machine for use in making wirebound boxes comprising, in combination, a work support; mechanism to apply binding wire to box parts; means to cause relative progression between said mechanism and the box parts; and an oscillating wire-severing means comprising a pair of cutting members adapted to sever a plurality of wires.

12. A machine for use in making wire bound boxes comprising, in combination, a work support; mechanism to apply binding wires to box parts; means to cause relative progression between said mechanism and the box parts; and a single wire-severing means movable with the work and adapted to sever a plurality of wires.

13. A machine for use in making wirebound boxes comprising, in combination, a work support; mechanism to apply binding wire to box parts; means to cause relative progression between said mechanism and the box parts; a single wire-severing means adapted to sever a plurality of wires; and gauging means for determining the point of cut off relative to a box part edge.

14. A machine for use in making wirebound boxes comprising, in combination, a work support; mechanism to apply binding wire to box parts; means to cause relative progression between said mechanism and the box parts; and a single wire-severing means adapted to sever a plurality of wires at a fixed point relative to edges of box parts; and work-engaging means for determining the point of cut off.

15. A machine for use in making wirebound boxes comprising, in combination, means for applying a plurality of binding wires in spaced relationship to box parts; means to cause relative progression between the box parts and said applying means; and mean to automatically sever said plurality of spaced wires between successive box parts after said wires have been secured to said successive box parts comprising a pair of cooperable shearing members; and means controlled by said relative progression for operating the same.

16. A machine for use in making wirebound boxes comprising, in combination, work-forwarding means; mechanism to secure binding wire to box parts; a single wire-severing means adapted to sever a plurality of wires secured to the box parts in spaced relationship; and a controller for said wire-severing means actuated by the work.

17. A machine for use in making wirebound boxes comprising, in combination, work-forwarding means; mechanism for applying a plurality of binding wires to box parts in spaced relationship; means to cause relative progression between said mechanism and the work; a single oscillating wiresevering means adapted to sever said plurality of spaced binding wires; and actuating means therefor controlled by the work.

18. In a machine of the class described, the combination of means to secure binding wire to box blanks; work-forwarding means; and wire-severing means adapted to move with the work during a severing operation comprising a pair of cutting members extending across the machine, one above and one below the wire; and means to cause cooperation of said members to sever the wire therebetween.

19. A machine for use in making wirebound boxes comprising, in combination, means for securing a plurality of binding wires to box parts; means to cause relative progression between the box parts and said securing means; and means automatically to sever said plurality of wires between successive box parts comprisng a pair of cooperable shearing members movable with the work during a severing operation.

20. A machine for use in making wirebound boxes comprising, in combination, means for securing a plurality of binding wires to box parts; means to cause relative progression between the box parts and said securing means; and means comprising a pair of cooperable shearing members adapted automatically to sever said plurality of wires between successive box assemblies at a definite point relative to the edge of each assembly, regardless of the extent of work movement.

21. A machine for use in making wirebound boxes comprising, in combination, means to apply binding wire to box parts; and mechanism to sever the binding wire between box parts comprising relatively movable knives, an oscillating support therefor, means to cause relative movement of said knives and a regulable clutch mechanism for controlling said relative movement; said machine being constructed and arranged to operate without interruption upon a plurality of box assemblies.

22. A machine for use in making wirebound boxes comprising, in combination, means to feed box parts; means to apply binding wire to the box parts; and mechanism to sever the binding wire between box parts comprising relatively movable knives, an oscillating support therefor, actuating means for said knives, and clutch mechanism for controlling said actuating means, said clutch mechanism being controlled by the passage of the box parts through the machine.

23. A machine for use in making wire bound boxes comprising, in combination, means to apply binding wire to box parts; means to feed the box parts to said bindingwire-applying means; and means to sever the binding wire between box parts comprising a single wire severing means adapted to sever a plurality of wires and movable with the box parts during a severing operation.

24. A machine for use in making wire bound boxes comprising, in combination, means to apply binding wire to box parts; means to feed the box parts to said binding-wire-applying means; and means to sever the binding wire between box parts comprising a pair of cutting members adapted to sever a plurality of spaced wires secured to moving box parts.

25. A machine for use in making wire bound boxes comprising, in combination, intermittently moving work-forwarding means; mechanism to apply binding wire to box parts; and wire severing means adapted to operate at a fixed point relative to the edge of a box part while the work is moving or stationary.

26. A machine for use in making wire bound boxes comprising, in combination, intermittently moving work-forwarding means; mechanism to apply binding wire to box parts; and wire severing means adapted to remain a fixed distance from a box part edge during a severing operation regardless of work movement and to sever a wire during a work movement or while the work is at rest.

In testimony whereof, I have signed my name to this specification.

OSCEOLA C. THOMPSON.